US008110039B2

(12) United States Patent
Hunt

(10) Patent No.: US 8,110,039 B2
(45) Date of Patent: Feb. 7, 2012

(54) CEMENTITIOUS MATERIAL

(75) Inventor: Gary Hunt, Porth (GB)

(73) Assignee: Cenin Limited, Bridgend (GB)

( * ) Notice: Subject to any disclaimer, the term of this patent is extended or adjusted under 35 U.S.C. 154(b) by 1169 days.

(21) Appl. No.: 10/554,524

(22) PCT Filed: Apr. 29, 2004

(86) PCT No.: PCT/GB2004/001811

§ 371 (c)(1), (2), (4) Date: Jun. 26, 2006

(87) PCT Pub. No.: WO2004/096727

PCT Pub. Date: Nov. 11, 2004

(65) Prior Publication Data

US 2006/0278131 A1 Dec. 14, 2006

(30) Foreign Application Priority Data

Apr. 29, 2003 (GB) .................................. 0309861.3

(51) Int. Cl.
*C04B 18/00* (2006.01)

(52) U.S. Cl. ........ 106/696; 106/705; 106/713; 106/714; 106/737; 106/745; 106/789

(58) Field of Classification Search .................. 106/696, 106/705, 713, 714, 737, 745, 789
See application file for complete search history.

(56) References Cited

U.S. PATENT DOCUMENTS 4,210,457 A 7/1980 Dodson et al.
4,240,952 A 12/1980 Hulbert, Jr. et al.
4,741,776 A * 5/1988 Bye et al. ...................... 588/256
4,756,761 A * 7/1988 Philip et al. .................... 106/714
5,520,730 A * 5/1996 Barbour ........................ 106/707
6,231,663 B1 * 5/2001 Catterton et al. ............. 106/705
6,451,104 B2 * 9/2002 Mehta .......................... 106/705
6,451,105 B1 9/2002 Turpin, Jr.
6,645,290 B1 * 11/2003 Barbour ........................ 106/705
6,939,834 B1 * 9/2005 Vattement ..................... 507/269
7,141,112 B2 * 11/2006 Comrie ......................... 106/697
2003/0159624 A1 * 8/2003 Kinuthia et al. .............. 106/707

FOREIGN PATENT DOCUMENTS

EP 0786438 A1 7/1997
GB 2221674 A 2/1990
JP 2002348153 A 12/2002

OTHER PUBLICATIONS

PL 166663 (Jun. 30, 1995) Pilch et al. abstract only.*
Official Communication from the European Patent Office, dated Mar. 13, 2009.

* cited by examiner

*Primary Examiner* — Paul Marcantoni
(74) *Attorney, Agent, or Firm* — RatnerPrestia

(57) ABSTRACT

A method of manufacturing a hydratable cementitious material, which includes: a) providing at least one waste material containing calcium, silica, magnesium, aluminium, and/or iron; b) thermally treating each waste material to a first temperature such that surface water vapour present is substantially removed; and c) blending the treated waste material such that the resultant blend has a reactive oxide chemical/physical composition in the following range, by weight of the blend: Calcium Oxide 7.0 to 76% Alumina 0.1 to 30% Iron Oxide 0.4 to 19% Silica Oxide 1 to 36% Magnesia 0.1 to 2%. The resultant blend from step c) may subsequently be mixed with Portland cement.

32 Claims, 4 Drawing Sheets

CEMENTITIOUS MATERIAL

The present invention is concerned with a cementitious material that can be used as a partial replacement of ordinary Portland cement, and a method of making a cementitious material.

Portland cement, as a cementitious material, is well established and widely used in Industry. Portland cement provides a strong and durable component in the product (concrete/mortar).

The main constituents of Portland cement includes Portland cement clinker (a hydraulic material which consists of two-thirds by weight Calcium Silicates($(CaO)_3SiO_2(CaO)_2$ $SiO_2$), the remainder being Calcium Aluminates ($CaO_3Al_2O_3$, and Calcium ferro-aluminate $(CaO)_4$ $Al_2$ $O_3$ $Fe_2$ $O_3$ (and other oxides), minor additional constituents, such as granulated blast furnace slag, natural pozzolana, pulverised fuel ash (fly ash or filler), Calcium Sulfate and additives. Minor constituents of up to 5% can be added and the cement is still classed as Ordinary Portland Cement. After the addition of Ground Granulated Blast Furnace Slag (GGBS), Pulverised Fuel Ash (PFA) etc., the resultant cement is classed as a composite cement.

However, Portland cement has the disadvantage that its production is a high energy intensive process that involves significant environmental damage due to the high level of carbon dioxide and other green house gasses produced. Furthermore, Portland cement has a further disadvantage of being the most expensive component of concrete and mortar.

Industrial wastes and by-products are, in general, considered to be a serious environmental problem. At present, many of these waste materials/by-products are dumped to landfill. Some of these industrial waste and by-products contain elements that are common to those found in cements and cement replacements. However, they do not necessarily, contain the required chemical composition and/or the desired physical properties.

It is therefore an aim of the present invention to alleviate at least some of the disadvantages highlighted above.

It is a further aim of the present invention to provide a partial replacement for Portland cement.

It is yet a further aim of the present invention to provide a use of Industrial waste material and/or Industrial by-products.

Therefore, according to the first aspect of the invention, there is a provided a method of producing a cementitious material, which method includes:

providing a blend of one or more waste material wherein each waste material contains either iron, calcium, magnesium, aluminium and/or silica;

thermally treating each waste material to a temperature of at least 100° C.;

providing a blend comprising the thermally treated waste materials to form a cement substitute, extender or addition; and mixing the blend of waste materials with Portland cement, so as to form a hydratable cementitious material.

Figure 1:
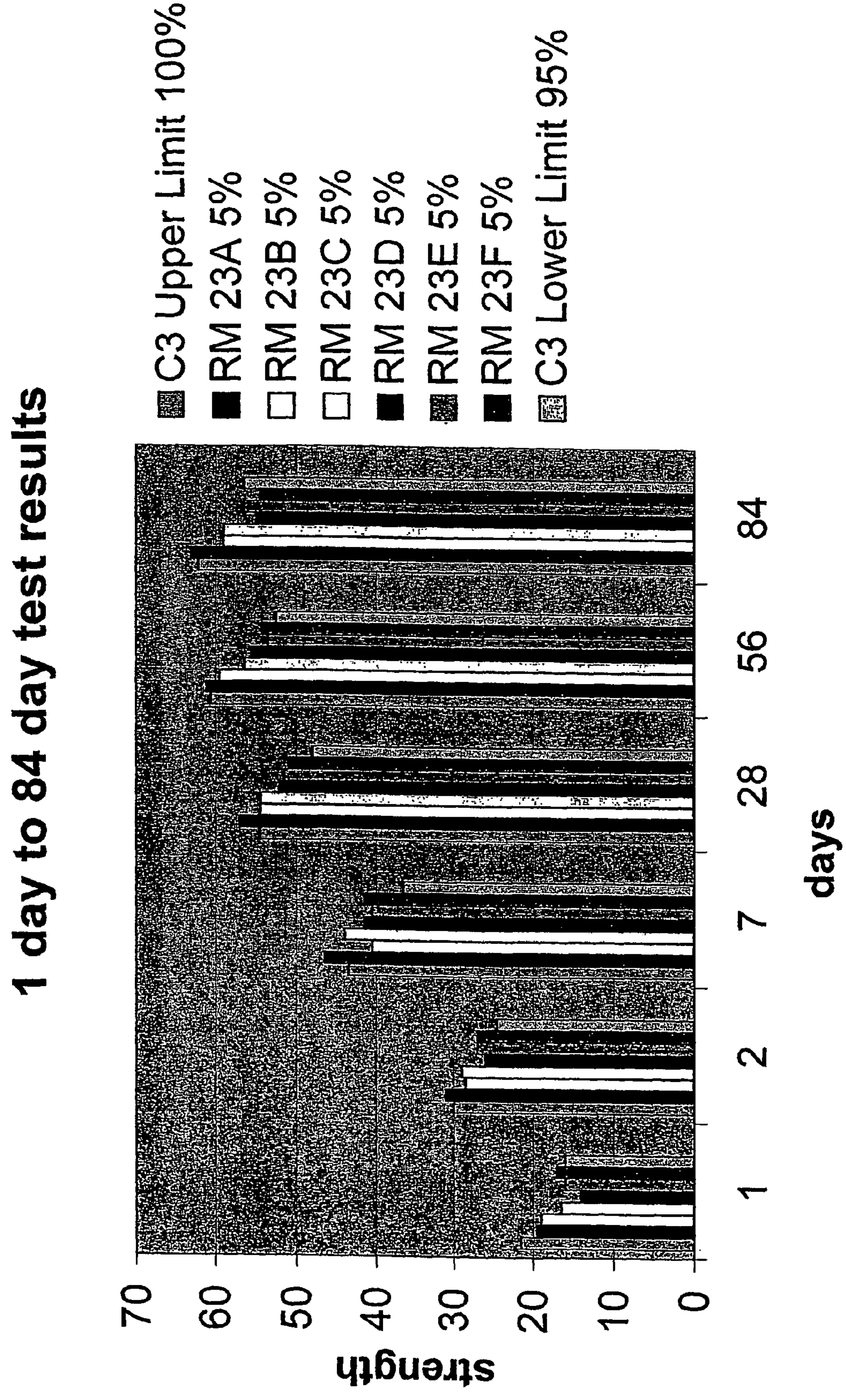
FIGS. 1, 2, 3, 4*a* and 4*b* illustrate various test results obtained as described in the Examples set forth herein.

The term "waste material", as used herein, is any material (including by-products) that would have little or no further purpose and is typically dumped in landfill sites. The term "waste material" is also intended to cover Industrial waste and by-products that are stockpiled causing further environmental problems.

According to a further aspect of the present invention, there is provided a method of manufacturing a cementitious material, which method includes:

a) providing at least one waste material containing calcium, silica, magnesium, aluminium, and/or iron;

b) thermally treating each waste material to a first temperature such that surface water vapour present is substantially removed; and c) blending the treated waste material such that the resultant blend has free reactive oxide content in the following range by weight of the blend:

| | |
|---|---|
| Calcium oxide | 7.0 to 76% |
| Alumina | 0.1 to 30% |
| Iron oxide | 0.4 to 19% |
| Silica oxide | 1 to 36% |
| Magnesia | 0.1 to 32%. |

Preferably, the method further includes:

d) mixing the resultant blend with Portland cement.

The composition given in c) is the free reactive oxide content. It is envisaged that other oxides may be present (or indeed more calcium oxide, alumina, iron oxide, silica oxide or magnesia), however they are bound and therefore unable to react. "Free reactive oxides" may include oxides which react in a blend so as to substantially enhance the strength development of the resultant cementious material.

The term "thermally treating" means treating the waste materials to remove the total moisture content at a temperature below which green house gas emissions may be driven off. Green house gasses include carbon dioxide, methane, nitrous oxide, perfluorocarbons, hydrofluorocarbons and sulfur hexafluoride.

Typically, the method further includes e) hydrating the hydratable cementitious material.

The values for calcium, Silica, Magnesia, Alumina and Iron are all typically measured in the oxide form.

Preferably, the waste materials are thermally treated separately in step b).

Preferably, the method further includes thermally treating the waste material to a second temperature so as to substantially change the chemical and/or physical composition of the waste material.

The waste material may also be thermally treated to a third temperature after step c), typically before step d). It is envisaged that the waste materials may be thermally treated once blended, however, it is preferred that the waste materials are thermally treated separately.

It is envisaged that, if more than one waste material is used, each waste material may be thermally treated to a different temperature depending upon the desired chemical/physical composition.

It is important to note that the first temperature, second temperature and/or third temperature are specific to each waste material and the desired chemical composition of the end user. However, it should be noted that it is particularly preferred that each temperature does not exceed about 500° C., further preferably does not exceed about 200° C. At about 200° C. green houses gases (such as carbon dioxide, methane, nitrous oxide, perfluorocarbons, hydrofluorocarbons and sulphur hexafluoride) are given off which are harmful to the environment.

The resultant blend typically has a 'Loss on ignition' value of 5 or less.

Typical waste materials include, but are not limited to, power station ash produced as a result of burning of oil shale, weathered blast furnace slag, marble and granite produced during cutting and polishing (and mixes thereof), waste material from the ceramics industry, filter cake material from stainless steel processing, steel slag, pelletized blast furnace slag, granular blast furnace slag, aluminium flu dusts, waste material from the production of silica, hydrated lime, filter dust obtained from dust extraction from quarrying processes, waste material from slate recovery plants, dust/residue from reclamation of the scrap metal industry, waste material obtained from the glass production and disposal plants, and incinerator ash typically from waste paper sludge and sewage sludge.

The waste material may typically include one or more of Calcium, Silica, Aluminium, Magnesium and/or Iron, which are preferably present in the oxide form.

Typically, the calcium oxide is present in the blend in an amount from about 20% to about 70% by weight of the blend. Preferably in the range 30% to about 60%, further preferably in the range 35-55% by weight of the blend.

Typically, the silica is present in the blend in an amount from about 5% to about 35% by weight of the blend. Preferably, the silica is present in an amount from about 15% to 30% by weight of the blend. Further preferably, the silica is present in an amount from about 18% to 24% by weight of the blend.

Typically, the magnesia is present in the blend in an amount in the range from about 0.5% to about 15% by weight of the blend. Preferably in the range 1.0 to 10%, further preferably 1.0 to 5% by weight of the blend.

Typically, the alumina is present in the blend in an amount in the range from about 5.0% to about 20% by weight of the blend. Preferably in the range 8 to 18%, further preferably 10 to 16% by weight of the blend.

Typically, the iron oxide is present in the blend in an amount in the range from about 2.0 to 10% by weight of the cementitious material. Preferably 3% to 8%, further preferably 4 to 7% by weight of the cementitious material.

It is particularly preferred that the blend is processed and/or stabilised prior to mixing with the Portland cement. The processing and/or stabilisation step may include thermally treating the blend typically to a temperature above about 100° C., preferably above about 105° C. Advantageously, above 100° C. surface water vapour is removed from the blend.

It is envisaged that when more than one waste material is present in the blend, each waste material may be processed separately, or together.

The blend may further be analysed so as to determine its structure, the analysis may be by chemical analysis using laser technology, inductively coupled plasma technique, x-ray fluorescence, x-ray diffraction (XRD) which gives crystalinity results and compounds that form during hydration and/or scanning electron microscopy (SEM) which identifies the pores as back scattered electron images.

The waste material is processed so as to change the physical composition of the blend, depending upon the final requirements of the cementitious material. For example, the waste material may be processed to a temperature above about 450° C. However, it is envisaged that the waste material may also be processed to above about 1000° c. if such a temperature is necessary to change the chemical composition and/or physical structure of the waste material to the desired structure. Depending upon the waste material, the desired structure may be crystalline, amorphous or semi-amorphous. However, as mentioned hereinbefore, it is particularly desirable that the waste materials are not thermally treated substantially above 200° C. as greenhouse gasses are typically given off above this temperature.

The blend may be thermally treated in a rotary kiln at temperatures ranging from about 100° C. to over about 1000° C. Alternatively, waste materials that are not suitable for thermally treating in a rotary kiln (such as the more homogenous materials that would become ball shaped whilst the centre of the waste material retains moisture) can be thermally treated in a fluidised bed drier at temperatures ranging from about 100° C. to over about 1000° C.

It is particularly preferred that the waste material has a particle size of less than about 10 mm in diameter, further preferably less than about 5 mm in diameter prior to step b). A particle size of about 1 mm is preferred.

There are a number of effects that have to be considered during the thermal treatment process, as individual materials can have significant physical and chemical changes made that are a benefit to the cementitious material.

The main requirements that govern the limits for use as a cement replacement are loss of ignition, free lime, insoluble residue, chloride and sulfate (as $SO_3$) content; the final cementitious material must comply with these limits to be acceptable. The temperature to which the blend is thermally treated varies depending upon the waste materials used in the blend.

Furthermore, some of the proportions of the elements are increased at higher temperatures as the materials become pure as a result of involatile materials (such as carbon) being driven off. As mentioned above, the blend or waste material is thermally treated to a temperature whereby the preferred structure (whether it is crystalline, semi-amorphous or amorphous) is obtained.

Advantageously, the thermal treatment stage reduces the amount of trace elements present in the blend. The trace elements are typically reduced to a range that is substantially the same, or preferably less than the range of trace elements in Portland cement, or the range of trace elements in Industrial accepted blends of Ordinary Portland cement (OPC), Ground granulated blast furnace slag (GGBS) and Pulverised Fly ash (PFA).

It is particularly preferred that the waste material is in finely divided, particulate or granular form. The waste material can be ground or cut using techniques known in the field.

Typically, the thermally treated waste material has a particle size of less than about 100 um in diameter, preferably below 50 um, such as below 40 um in diameter prior to mixing with the Portland cement. Advantageously, the waste material is substantially the same size or less as the particle size of ordinary Portland cement.

Advantageously, the material would have an improved grade curve to that of OPC which would improve the performance of the cement in the aggregate cement interface and the passive layer around reinforcement.

The Portland cement and the waste material blend are typically mixed in accordance with standard methods known to a person skilled in the art.

It is particularly preferred that the magnesia is present as free reactive magnesia. Advantageously, pure reactive magnesia significantly improves strength gain from 2 to 28 days and beyond. It has been determined that the reactivity is related to the purity and specific surface area; therefore, it is particularly preferred that the Magnesia is free reactive Magnesia which is typically substantially pure. The Magnesia preferably has a purity of about 42% to 100%. However, a particularly preferred purity is 80% to 98%, typically 85% to 95%. Suitable Magnesia is sold by CJC Chemicals and Magnesia Ltd under the product codes CJC Mag Oxide 96/575, 93/12F, 9334F, P, Q and/or N.

The inclusion of Magnesia in the cementitious material in the amounts identified above are particularly advantageous as the strength properties of the resultant cementitious material are greatly enhanced. Furthermore, expansion of cement is maintained, or less than OPC). Therefore, according to yet a further aspect of the invention, Magnesia is added to the blend of one or more waste materials if the blend does not already contain Magnesia in the preferred amounts or desired composition. The Magnesia is substantially as described herein before.

The amount of blend present in the hydratable cementitious material varies depending on the final requirement of the cementitious material. The characteristics of the blend may be changed to satisfy specific tests for compliance to, for example, European Standards.

The analysing step may involve chemical analysis using laser technology, inductively coupled plasma technique and/or x-ray fluorescence.

The present invention will now be described by way of example only.

EXAMPLES

The raw materials, as identified in table 1, were used in the following examples.

TABLE 1

| | | | |
|---|---|---|---|
| RM1 | Power station ash - burning of oil shell | RM2 | Power station ash - burning of oil shell |
| RM3 | Weathered Blast Furnace Slag | RM4 | Waste material from the cutting & polishing of marble |
| RM5 | Waste material from the cutting & polishing of granite | RM6 | Waste material from the cutting & polishing of marble & granite |

TABLE 1-continued

| | | | |
|---|---|---|---|
| RM7 | Waste material from the ceramics industry | RM8 | Waste material from the manufacture of storm drains for highways |
| RM9 | Filter cake material from stainless steel processing | RM10 | Steel Slag |
| RM11 | Pellet blast furnace slag | RM12 | Granular Blast Furnace Slag |
| RM13 | Aluminium Flue Dusts | RM14 | Waste material from the production of Silica |
| RM15 | Hydrated lime | RM16 | Filler dust from extraction at quarry |
| RM18 | Filler dust from extraction at quarry | RM19 | Filler dust from extraction at quarry |
| RM20 | Waste material from slate recovery plant | RM21 | Dust residue from reclamation of scrap metal |
| RM22 | Waste material from galss disposal and production plants | RM23 | Magnesium Oxide |
| RM26 | Sewage Sludge | RM28 | Sandstone fines from quarry waste |

Waste materials RM3, RM7, RM8, RM9 and RM16 were all separately thermally treated to 107° C. The limits of the trace elements and loss of ignition, free lime and insoluble residue for each raw material are given in Tables 2 to 6 respectively.

The raw materials are assessed against the combined limits for OPC and GGBS. The total amount of each treated raw material that can be added to the blend according to the present invention is also identified. The maximum amount of each waste material that can be added to the blend is given in the box that is shaded in Tables 2 to 6.

For example, when considering RM9 thermally treated to 107° C., only 10% can be added to the blend; if a greater amount is added to the blend the amount of iron present would be too great and therefore outside acceptable limits. However, when considering RM3 treated to 107° C., up to 50% of the waste material can be added to the blend.

TABLE 2

| | RM3 @107 | | | | | | | | | | | | | | | | |
|---|---|---|---|---|---|---|---|---|---|---|---|---|---|---|---|---|---|
| Oxide factor | Element | Lower Limit | Upper Limit | Lower Limit | Upper Limit | European | Element | 100 | 90 | 80 | 70 | 60 | 50 | 40 | 30 | 20 | 10 |
| | | | | | | | | % | % | % | % | % | % | % | % | % | % |
| 1.4 | Ca | 49.487 | 75.457 | 7.721 | 75.457 | | Ca | 60.172 | 54.155 | 48.137 | 42.120 | 38.103 | 30.086 | 24.069 | 18.052 | 12.034 | 6.017 |
| 2.14 | Si | 14.357 | 27.640 | 14.357 | 35.860 | | Si | 21.838 | 19.654 | 17.470 | 15.287 | 13.103 | 10.919 | 8.735 | 6.551 | 4.388 | 2.184 |
| 1.89 | Al | 3.257 | 11.533 | 3.257 | 29.556 | | Al | 7.131 | 6.418 | 5.705 | 4.992 | 4.278 | 3.565 | 2.852 | 2.139 | 1.426 | 0.713 |
| 1.66 | Mg | 0.935 | 8.697 | 0.935 | 8.697 | | Mg | 5.419 | 4.877 | 4.335 | 3.793 | 3.251 | 2.709 | 2.167 | 1.626 | 1.084 | 0.542 |
| 1.43 | Fe | 0.436 | 4.575 | 0.436 | 18.940 | | Fe | 2.160 | 1.944 | 1.728 | 1.512 | 1.296 | 1.080 | 0.864 | 0.648 | 0.432 | 0.216 |
| 1.35 | Na | 0.049 | 0.770 | 0.049 | 1.246 | | Na | 0.133 | 0.120 | 0.106 | 0.093 | 0.080 | 0.066 | 0.053 | 0.040 | 0.027 | 0.013 |
| 1.2 | K | 0.784 | 1.725 | 0.784 | 1.725 | | K | 0.670 | 0.603 | 0.536 | 0.469 | 0.402 | 0.335 | 0.268 | 0.201 | 0.134 | 0.067 |
| 2.29 | P | 0.010 | 0.101 | 0.010 | 0.543 | | P | 0.034 | 0.031 | 0.027 | 0.024 | 0.021 | 0.017 | 0.014 | 0.010 | 0.007 | 0.003 |

TABLE 2-continued

| | | | | | | | | | | | | | | | | | |
|---|---|---|---|---|---|---|---|---|---|---|---|---|---|---|---|---|---|
| 1.24 | Zn | 0.027 | 0.789 | 0.027 | 0.789 | | Zn | 0.005 | 0.004 | 0.004 | 0.003 | 0.003 | 0.002 | 0.002 | 0.001 | 0.001 | 0.000 |
| 1.78 | V | 0.008 | 0.031 | 0.008 | 0.106 | | V | 0.061 | 0.055 | 0.049 | 0.043 | 0.037 | 0.031 | 0.024 | 0.016 | 0.012 | 0.006 |
| 1.67 | Ti | 0.162 | 0.640 | 0.162 | 2.115 | | Ti | 1.187 | 1.068 | 0.950 | 0.831 | 0.712 | 0.593 | 0.475 | 0.356 | 0.237 | 0.119 |
| 1.29 | Mn | 0.047 | 0.734 | 0.047 | 0.734 | | Mn | 1.180 | 1.062 | 0.944 | 0.826 | 0.708 | 0.590 | 0.472 | 0.354 | 0.236 | 0.118 |
| 1.46 | Cr | 0.004 | 0.015 | 0.004 | 0.047 | | Cr | 0.011 | 0.010 | 0.009 | 0.008 | 0.007 | 0.006 | 0.005 | 0.003 | 0.002 | 0.001 |
| | $Na_2O$ eq | | 0.650 | | | | $Na_2O$ eq | 0.255 | 0.229 | 0.204 | 0.178 | 0.153 | 0.127 | 0.102 | 0.076 | 0.051 | 0.025 |
| | Cl— | | | | | 0.1 | Cl— | 0.006 | 0.006 | 0.005 | 0.004 | 0.004 | 0.003 | 0.002 | 0.002 | 0.001 | 0.001 |
| | $SO_4$ | | | | | 3.5-5 | $SO_4$ | | 0.000 | 0.000 | 0.000 | 0.000 | 0.000 | 0.000 | 0.000 | 0.000 | 0.000 |
| | Loss on ignition | | | | | 5.0 | Loss on ignition | 2.06 | 1.854 | 1.648 | 1.442 | 1.236 | 1.030 | 0.824 | 0.618 | 0.412 | 0.206 |
| | Free Lime | | | | | 1* | Free Lime | 0.30 | 0.270 | 0.240 | 0.210 | 0.180 | 0.150 | 0.120 | 0.090 | 0.060 | 0.030 |
| | Insoluble Residue | | | | | 5.0 | Insoluble Residue | 1.06 | 0.954 | 0.848 | 0.742 | 0.636 | 0.530 | 0.424 | 0.318 | 0.212 | 0.106 |

TABLE 3

| | RM7 @107 | | | | | | | | | | | | | | | | |
|---|---|---|---|---|---|---|---|---|---|---|---|---|---|---|---|---|---|
| Oxide factor | Element | Lower Limit | Upper Limit | Lower Limit | Upper Limit | European | Element | 100 | 90 | 80 | 70 | 60 | 50 | 40 | 30 | 20 | 10 |
| | | | | | | | | % | % | % | % | % | % | % | % | % | % |
| 1.4 | Ca | 49.487 | 75.457 | 7.721 | 75.457 | | Ca | 31.783 | 28.605 | 25.426 | 22.248 | 19.070 | 15.892 | 12.713 | 9.535 | 6.357 | 3.178 |
| 2.14 | Si | 14.357 | 27.640 | 14.357 | 35.860 | | Si | 25.045 | 22.541 | 20.036 | 17.532 | 15.027 | 12.523 | 10.018 | 7.514 | 5.009 | 2.505 |
| 1.89 | Al | 3.257 | 11.533 | 3.257 | 29.556 | | Al | 15.635 | 14.072 | 12.508 | 10.945 | 9.381 | 7.818 | 6.254 | 4.691 | 3.127 | 1.564 |
| 1.66 | Mg | 0.935 | 8.697 | 0.935 | 8.697 | | Mg | 0.979 | 0.881 | 0.783 | 0.686 | 0.588 | 0.490 | 0.392 | 0.294 | 0.196 | 0.098 |
| 1.43 | Fe | 0.436 | 4.575 | 0.436 | 18.940 | | Fe | 0.562 | 0.505 | 0.449 | 0.393 | 0.337 | 0.281 | 0.225 | 0.168 | 0.112 | 0.056 |
| 1.35 | Na | 0.049 | 0.770 | 0.049 | 1.246 | | Na | 1.222 | 1.100 | 0.978 | 0.856 | 0.733 | 0.611 | 0.489 | 0.367 | 0.244 | 0.122 |
| 1.2 | K | 0.784 | 1.725 | 0.784 | 1.725 | | K | 1.604 | 1.444 | 1.283 | 1.123 | 0.963 | 0.802 | 0.642 | 0.481 | 0.321 | 0.160 |
| 2.29 | P | 0.010 | 0.101 | 0.010 | 0.543 | | P | 23.059 | 20.753 | 18.447 | 16.141 | 13.835 | 11.529 | 9.224 | 6.918 | 4.612 | 2.306 |

TABLE 3-continued

| | | | | | | | | | | | | | | | | | |
|---|---|---|---|---|---|---|---|---|---|---|---|---|---|---|---|---|---|
| 1.24 | Zn | 0.027 | 0.789 | 0.027 | 0.789 | | Zn | 0.017 | 0.016 | 0.014 | 0.012 | 0.010 | 0.009 | 0.007 | 0.005 | 0.003 | 0.002 |
| 1.78 | V | 0.008 | 0.031 | 0.008 | 0.106 | | V | 0.006 | 0.005 | 0.005 | 0.004 | 0.003 | 0.003 | 0.002 | 0.002 | 0.001 | 0.001 |
| 1.67 | Ti | 0.162 | 0.640 | 0.162 | 2.115 | | Ti | 0.069 | 0.062 | 0.055 | 0.048 | 0.041 | 0.035 | 0.028 | 0.021 | 0.014 | 0.007 |
| 1.29 | Mn | 0.047 | 0.734 | 0.047 | 0.734 | | Mn | 0.014 | 0.012 | 0.011 | 0.010 | 0.008 | 0.007 | 0.006 | 0.004 | 0.003 | 0.001 |
| 1.46 | Cr | 0.004 | 0.015 | 0.004 | 0.047 | | Cr | 0.004 | 0.004 | 0.003 | 0.003 | 0.003 | 0.002 | 0.002 | 0.001 | 0.001 | 0.000 |
| | $Na_2O$ eq | | 0.650 | | | | $Na_2O$ eq | 1.722 | 1.550 | 1.378 | 1.205 | 1.033 | 0.861 | 0.689 | 0.517 | 0.344 | 0.172 |
| | Cl— | | | | | 0.1 | Cl— | 0.015 | 0.014 | 0.012 | 0.011 | 0.009 | 0.008 | 0.006 | 0.005 | 0.003 | 0.002 |
| | $SO_4$ | | | | | 3.5-5 | $SO_4$ | | 0.000 | 0.000 | 0.000 | 0.000 | 0.000 | 0.000 | 0.000 | 0.000 | 0.000 |
| | Loss on ignition | | | | | 5.0 | Loss on ignition | 5.15 | 4.635 | 4.120 | 3.605 | 3.090 | 2.575 | 2.060 | 1.545 | 1.030 | 0.515 |
| | Free Lime | | | | | 1* | Free Lime | 0.07 | 0.063 | 0.056 | 0.049 | 0.042 | 0.035 | 0.028 | 0.021 | 0.014 | 0.007 |
| | Insoluble Residue | | | | | 5.0 | Insoluble Residue | 65.96 | 59.364 | 52.768 | 48.172 | 39.576 | 32.980 | 26.384 | 19.788 | 13.192 | 6.596 |

TABLE 4

| | RM8 @107 | | | | | | | | | | | | | | | | |
|---|---|---|---|---|---|---|---|---|---|---|---|---|---|---|---|---|---|
| Oxide factor | Element | Lower Limit | Upper Limit | Lower Limit | Upper Limit | European | Element | 100 | 90 | 80 | 70 | 60 | 50 | 40 | 30 | 20 | 10 |
| | | | | | | | | % | % | % | % | % | % | % | % | % | % |
| 1.4 | Ca | 49.487 | 75.457 | 7.721 | 75.457 | | Ca | 32.598 | 29.338 | 26.078 | 22.818 | 19.559 | 16.299 | 13.039 | 9.779 | 6.520 | 3.260 |
| 2.14 | Si | 14.357 | 27.640 | 14.357 | 35.860 | | Si | 26.431 | 23.788 | 21.145 | 18.502 | 15.859 | 13.215 | 10.572 | 7.929 | 5.288 | 2.643 |
| 1.89 | Al | 3.257 | 11.533 | 3.257 | 29.556 | | Al | 11.918 | 10.726 | 9.534 | 8.343 | 7.151 | 5.959 | 4.767 | 3.575 | 2.384 | 1.192 |
| 1.66 | Mg | 0.935 | 8.697 | 0.935 | 8.697 | | Mg | 9.135 | 8.221 | 7.308 | 6.394 | 5.481 | 4.567 | 3.654 | 2.740 | 1.827 | 0.913 |
| 1.43 | Fe | 0.436 | 4.575 | 0.436 | 18.940 | | Fe | 9.892 | 8.903 | 7.913 | 6.924 | 5.935 | 4.946 | 3.957 | 2.968 | 1.978 | 0.989 |
| 1.35 | Na | 0.049 | 0.770 | 0.049 | 1.246 | | Na | 0.292 | 0.263 | 0.234 | 0.205 | 0.175 | 0.146 | 0.117 | 0.088 | 0.058 | 0.029 |
| 1.2 | K | 0.784 | 1.725 | 0.784 | 1.725 | | K | 0.446 | 0.402 | 0.357 | 0.313 | 0.268 | 0.223 | 0.179 | 0.134 | 0.089 | 0.045 |
| 2.29 | P | 0.010 | 0.101 | 0.010 | 0.543 | | P | 0.690 | 0.621 | 0.552 | 0.483 | 0.414 | 0.345 | 0.276 | 0.207 | 0.138 | 0.069 |

TABLE 4-continued

| | | | | | | | | | | | | | | | | |
|---|---|---|---|---|---|---|---|---|---|---|---|---|---|---|---|---|
| 1.24 | Zn | 0.027 | 0.789 | 0.027 | 0.789 | | Zn | 0.024 | 0.021 | 0.019 | 0.016 | 0.014 | 0.012 | 0.009 | 0.007 | 0.005 | 0.002 |
| 1.78 | V | 0.008 | 0.031 | 0.008 | 0.106 | | V | 0.066 | 0.060 | 0.053 | 0.047 | 0.040 | 0.033 | 0.027 | 0.020 | 0.013 | 0.007 |
| 1.67 | Ti | 0.162 | 0.640 | 0.162 | 2.115 | | Ti | 0.829 | 0.746 | 0.663 | 0.580 | 0.497 | 0.414 | 0.332 | 0.249 | 0.166 | 0.083 |
| 1.29 | Mn | 0.047 | 0.734 | 0.047 | 0.734 | | Mn | 7.391 | 6.652 | 5.913 | 5.174 | 4.435 | 3.696 | 2.957 | 2.217 | 1.478 | 0.739 |
| 1.46 | Cr | 0.004 | 0.015 | 0.004 | 0.047 | | Cr | 0.287 | 0.259 | 0.230 | 0.201 | 0.172 | 0.144 | 0.115 | 0.086 | 0.057 | 0.029 |
| | $Na_2O$ eq | | 0.650 | | | | $Na_2O$ eq | 0.254 | 0.228 | 0.203 | 0.178 | 0.152 | 0.127 | 0.102 | 0.076 | 0.051 | 0.025 |
| | Cl— | | | | | 0.1 | Cl— | 0.006 | 0.006 | 0.005 | 0.004 | 0.004 | 0.003 | 0.002 | 0.002 | 0.001 | 0.001 |
| | $SO_4$ | | | | | 3.5-5 | $SO_4$ | | 0.000 | 0.000 | 0.000 | 0.000 | 0.000 | 0.000 | 0.000 | 0.000 | 0.000 |
| | Loss on ignition | | | | | 5.0 | Loss on ignition | 0.10 | -0.090 | -0.080 | -0.070 | -0.060 | -0.050 | -0.040 | -0.030 | -0.020 | -0.010 |
| | Free Lime | | | | | 1* | Free Lime | 0.08 | 0.027 | 0.024 | 0.021 | 0.018 | 0.015 | 0.012 | 0.009 | 0.006 | 0.003 |
| | In-soluble Resi-due | | | | | 5.0 | In-soluble Resi-due | 16.11 | 14.499 | 12.888 | 11.277 | 9.666 | 8.055 | 6.444 | 4.833 | 3.222 | 1.611 |

TABLE 5

| | RM9 @107 | | | | | | | | | | | | | | | |
|---|---|---|---|---|---|---|---|---|---|---|---|---|---|---|---|---|
| Oxide factor | Ele-ment | Lower Limit | Upper Limit | Lower Limit | Upper Limit | Euro-pean | Ele-ment | 100 | 90 | 80 | 70 | 60 | 50 | 40 | 30 | 20 | 10 |
| | | | | | | | | % | % | % | % | % | % | % | % | % | % |
| 1.4 | Ca | 49.487 | 75.457 | 7.721 | 75.457 | | Ca | 47.472 | 42.724 | 37.977 | 33.230 | 28.483 | 23.736 | 18.989 | 14.241 | 9.494 | 4.747 |
| 2.14 | Si | 14.357 | 27.640 | 14.357 | 35.860 | | Si | 0.807 | 0.727 | 0.646 | 0.565 | 0.484 | 0.404 | 0.323 | 0.242 | 0.161 | 0.081 |
| 1.89 | Al | 3.257 | 11.533 | 3.257 | 29.556 | | Al | 0.337 | 0.303 | 0.269 | 0.236 | 0.202 | 0.168 | 0.135 | 0.101 | 0.067 | 0.034 |
| 1.66 | Mg | 0.935 | 8.697 | 0.935 | 8.697 | | Mg | 0.166 | 0.150 | 0.133 | 0.116 | 0.100 | 0.083 | 0.067 | 0.050 | 0.033 | 0.017 |
| 1.43 | Fe | 0.436 | 4.575 | 0.436 | 18.940 | | Fe | 45.569 | 41.012 | 36.455 | 31.898 | 27.341 | 22.784 | 18.227 | 13.671 | 9.114 | 4.557 |
| 1.35 | Na | 0.049 | 0.770 | 0.049 | 1.246 | | Na | 0.054 | 0.049 | 0.043 | 0.038 | 0.033 | 0.027 | 0.022 | 0.016 | 0.011 | 0.005 |
| 1.2 | K | 0.784 | 1.725 | 0.784 | 1.725 | | K | 0.022 | 0.020 | 0.017 | 0.015 | 0.013 | 0.011 | 0.009 | 0.007 | 0.004 | 0.002 |
| 2.29 | P | 0.010 | 0.101 | 0.010 | 0.543 | | P | 0.061 | 0.055 | 0.048 | 0.042 | 0.036 | 0.030 | 0.024 | 0.018 | 0.012 | 0.006 |

TABLE 5-continued

| | | | | | | | | | | | | | | | | | |
|---|---|---|---|---|---|---|---|---|---|---|---|---|---|---|---|---|---|
| 1.24 | Zn | 0.027 | 0.789 | 0.027 | 0.789 | | Zn | 0.003 | 0.003 | 0.002 | 0.002 | 0.002 | 0.001 | 0.001 | 0.001 | 0.001 | 0.000 |
| 1.78 | V | 0.008 | 0.031 | 0.008 | 0.106 | | V | 0.004 | 0.004 | 0.003 | 0.003 | 0.002 | 0.002 | 0.002 | 0.001 | 0.001 | 0.000 |
| 1.67 | Ti | 0.162 | 0.640 | 0.162 | 2.115 | | Ti | 0.020 | 0.018 | 0.016 | 0.014 | 0.012 | 0.010 | 0.008 | 0.006 | 0.004 | 0.002 |
| 1.29 | Mn | 0.047 | 0.734 | 0.047 | 0.734 | | Mn | 0.156 | 0.141 | 0.125 | 0.010 | 0.094 | 0.078 | 0.063 | 0.047 | 0.031 | 0.016 |
| 1.46 | Cr | 0.004 | 0.015 | 0.004 | 0.047 | | Cr | 5.330 | 4.797 | 4.264 | 3.731 | 3.198 | 2.665 | 2.132 | 1.599 | 1.066 | 0.533 |
| | $Na_2O$ eq | | 0.650 | | | | $Na_2O$ eq | 0.060 | 0.054 | 0.048 | 0.042 | 0.036 | 0.030 | 0.024 | 0.018 | 0.012 | 0.006 |
| | Cl— | | | | | 0.1 | Cl— | 0.008 | 0.007 | 0.006 | 0.006 | 0.005 | 0.004 | 0.003 | 0.002 | 0.002 | 0.001 |
| | $SO_4$ | | | | | 3.5-5 | $SO_4$ | | 0.000 | 0.000 | 0.000 | 0.000 | 0.000 | 0.000 | 0.000 | 0.000 | 0.000 |
| | Loss on ignition | | | | | 5.0 | Loss on ignition | 11.29 | 10.161 | 9.032 | 7.903 | 6.774 | 5.645 | 4.516 | 3.387 | 2.258 | 1.129 |
| | Free Lime | | | | | 1* | Free Lime | 0.10 | 0.090 | 0.080 | 0.070 | 0.060 | 0.050 | 0.040 | 0.030 | 0.020 | 0.010 |
| | In-soluble Resi-due | | | | | 5.0 | In-soluble Resi-due | 0.80 | 0.720 | 0.640 | 0.560 | 0.480 | 0.400 | 0.320 | 0.240 | 0.160 | 0.080 |

TABLE 6

| | RM16 @107 | | | | | | | | | | | | | | | | |
|---|---|---|---|---|---|---|---|---|---|---|---|---|---|---|---|---|---|
| Oxide factor | Ele-ment | Lower Limit | Upper Limit | Lower Limit | Upper Limit | Euro-pean | Ele-ment | 100 | 90 | 80 | 70 | 60 | 50 | 40 | 30 | 20 | 10 |
| | | | | | | | | % | % | % | % | % | % | % | % | % | % |
| 1.4 | Ca | 49.487 | 75.457 | 7.721 | 75.457 | | Ca | 93.556 | 84.201 | 74.845 | 65.489 | 56.134 | 46.778 | 37.422 | 28.067 | 18.711 | 9.356 |
| 2.14 | Si | 14.357 | 27.640 | 14.357 | 35.860 | | Si | 2.925 | 2.633 | 2.340 | 2.048 | 1.755 | 1.463 | 1.170 | 0.878 | 0.585 | 0.293 |
| 1.89 | Al | 3.257 | 11.533 | 3.257 | 29.556 | | Al | 1.225 | 1.102 | 0.980 | 0.857 | 0.735 | 0.612 | 0.490 | 0.367 | 0.245 | 0.122 |
| 1.66 | Mg | 0.935 | 8.697 | 0.935 | 8.697 | | Mg | 0.784 | 0.706 | 0.627 | 0.549 | 0.471 | 0.392 | 0.314 | 0.235 | 0.157 | 0.078 |
| 1.43 | Fe | 0.436 | 4.575 | 0.436 | 18.940 | | Fe | 0.785 | 0.706 | 0.628 | 0.549 | 0.471 | 0.392 | 0.314 | 0.235 | 0.157 | 0.078 |
| 1.35 | Na | 0.049 | 0.770 | 0.049 | 1.246 | | Na | 0.153 | 0.138 | 0.123 | 0.107 | 0.092 | 0.077 | 0.061 | 0.046 | 0.031 | 0.015 |
| 1.2 | K | 0.784 | 1.725 | 0.784 | 1.725 | | K | 0.381 | 0.343 | 0.305 | 0.267 | 0.229 | 0.190 | 0.152 | 0.114 | 0.076 | 0.038 |
| 2.29 | P | 0.010 | 0.101 | 0.010 | 0.543 | | P | 0.058 | 0.052 | 0.046 | 0.040 | 0.035 | 0.029 | 0.023 | 0.017 | 0.012 | 0.006 |

TABLE 6-continued

| | | | | | | | | | | | | | | | | | |
|---|---|---|---|---|---|---|---|---|---|---|---|---|---|---|---|---|---|
| 1.24 | Zn | 0.027 | 0.789 | 0.027 | 0.789 | | Zn | 0.010 | 0.009 | 0.008 | 0.007 | 0.006 | 0.005 | 0.004 | 0.003 | 0.002 | 0.001 |
| 1.78 | V | 0.008 | 0.031 | 0.008 | 0.106 | | V | 0.006 | 0.005 | 0.005 | 0.004 | 0.003 | 0.003 | 0.002 | 0.002 | 0.001 | 0.001 |
| 1.67 | Ti | 0.162 | 0.640 | 0.162 | 2.115 | | Ti | 0.068 | 0.061 | 0.054 | 0.047 | 0.041 | 0.034 | 0.027 | 0.020 | 0.014 | 0.007 |
| 1.29 | Mn | 0.047 | 0.734 | 0.047 | 0.734 | | Mn | 0.043 | 0.039 | 0.034 | 0.030 | 0.026 | 0.022 | 0.017 | 0.013 | 0.009 | 0.004 |
| 1.46 | Cr | 0.004 | 0.015 | 0.004 | 0.047 | | Cr | 0.007 | 0.006 | 0.006 | 0.005 | 0.004 | 0.004 | 0.003 | 0.002 | 0.001 | 0.001 |
| | $Na_2O$ eq | | 0.650 | | | | $Na_2O$ eq | 0.259 | 0.234 | 0.208 | 0.182 | 0.156 | 0.130 | 0.104 | 0.078 | 0.052 | 0.028 |
| | Cl— | | | | | 0.1 | Cl— | 0.022 | 0.020 | 0.018 | 0.016 | 0.013 | 0.011 | 0.009 | 0.007 | 0.004 | 0.002 |
| | $SO_4$ | | | | | 3.5-5 | $SO_4$ | | 0.000 | 0.000 | 0.000 | 0.000 | 0.000 | 0.000 | 0.000 | 0.000 | 0.000 |
| | Loss on ignition | | | | | 5.0 | Loss on ignition | 36.60 | 32.940 | 29.280 | 25.620 | 21.960 | 18.300 | 14.640 | 10.980 | 7.320 | 3.680 |
| | Free Lime | | | | | 1* | Free Lime | 0.90 | 0.810 | 0.720 | 0.630 | 0.540 | 0.450 | 0.360 | 0.270 | 0.180 | 0.090 |
| | In-soluble Resi-due | | | | | 5.0 | In-soluble Resi-due | 2.43 | 2.187 | 1.944 | 1.701 | 1.458 | 1.215 | 0.972 | 0.729 | 0.488 | 0.243 |

Tables 7 to 11 show the change in oxide percentages when waste materials RM3, RM7, RM8, RM9 and RM16 are thermally treated at temperatures of 109° C., 480° C. and 1000° C. As demonstrated in these figures, the oxide percentage varies considerably depending upon the temperature to which the waste material is treated.

TABLE 7

| Oxide | RM3 107 oxide % | 480 oxide % | 1000 oxide % |
|---|---|---|---|
| CaO | 52.248 | 51.846 | 51.949 |
| $SiO_2$ | 28.985 | 29.152 | 29.040 |
| $Al_2O_3$ | 8.359 | 8.313 | 8.323 |
| MgO | 5.579 | 5.741 | 5.901 |
| $Fe_2O_3$ | 1.916 | 1.937 | 1.985 |
| $Na_2O$ | 0.111 | 0.095 | 0.055 |
| $K_2O$ | 0.498 | 0.567 | 0.510 |
| $P_2O_5$ | 0.049 | 0.058 | 0.043 |
| ZnO | 0.004 | 0.005 | 0.011 |
| $V_2O_5$ | 0.068 | 0.070 | 0.067 |
| $TiO_2$ | 1.229 | 1.224 | 1.195 |
| MnO | 0.944 | 0.984 | 0.911 |
| $Cr_2O_3$ | 0.010 | 0.011 | 0.010 |
| SUM | 100.000 | 100.000 | 100.000 |

TABLE 8

| Oxide | RM7 107 Oxide % | 480 oxide % | 1000 oxide % |
|---|---|---|---|
| CaO | 23.843 | 24.389 | 25.604 |
| $SiO_2$ | 28.719 | 28.622 | 27.896 |
| $Al_2O_3$ | 15.834 | 15.775 | 14.916 |
| MgO | 0.871 | 0.788 | 0.753 |
| $Fe_2O_3$ | 0.430 | 0.412 | 0.448 |
| $Na_2O$ | 0.884 | 0.909 | 0.933 |
| $K_2O$ | 1.032 | 1.034 | 1.099 |
| $P_2O_5$ | 28.295 | 27.973 | 28.248 |
| ZnO | 0.011 | 0.011 | 0.012 |

TABLE 8-continued

| Oxide | RM7 107 Oxide % | 480 oxide % | 1000 oxide % |
|---|---|---|---|
| $V_2O_5$ | 0.006 | 0.004 | 0.006 |
| $TiO_2$ | 0.062 | 0.070 | 0.072 |
| MnO | 0.010 | 0.010 | 0.010 |
| $Cr_2O_3$ | 0.003 | 0.003 | 0.003 |
| SUM | 100.000 | 100.000 | 100.000 |

TABLE 9

| Oxide | RM8 107 oxide % | 480 oxide % | 1000 oxide % |
|---|---|---|---|
| CaO | 27.160 | 26.773 | 30.709 |
| $SiO_2$ | 33.662 | 34.548 | 30.261 |
| $Al_2O_3$ | 13.405 | 13.442 | 11.650 |
| MgO | 9.025 | 9.076 | 7.602 |
| $Fe_2O_3$ | 8.418 | 8.536 | 10.895 |
| $Na_2O$ | 0.235 | 0.179 | 0.146 |
| $K_2O$ | 0.319 | 0.327 | 0.366 |
| $P_2O_5$ | 0.941 | 0.275 | 0.220 |
| ZnO | 0.017 | 0.020 | 0.023 |
| $V_2O_5$ | 0.070 | 0.070 | 0.089 |
| $TiO_2$ | 0.824 | 0.832 | 0.957 |
| MnO | 5.675 | 5.661 | 6.774 |
| $Cr_2O_3$ | 0.250 | 0.261 | 0.307 |
| SUM | 100.000 | 100.000 | 100.000 |

TABLE 10

| oxide | RM9 107 oxide % | 480 oxide % | 1000 oxide % |
|---|---|---|---|
| CaO | 46.630 | 47.148 | 45.991 |
| $SiO_2$ | 1.212 | 1.215 | 0.783 |
| $Al_2O_3$ | 0.446 | 0.416 | 0.199 |

TABLE 10-continued

| oxide | RM9 107 oxide % | 480 oxide % | 1000 oxide % |
|---|---|---|---|
| MgO | 0.194 | 0.178 | 0.105 |
| $Fe_2O_3$ | 45.719 | 45.340 | 47.142 |
| $Na_2O$ | 0.051 | 0.028 | 0.048 |
| $K_2O$ | 0.018 | 0.018 | 0.019 |
| $P_2O_5$ | 0.097 | 0.098 | |
| ZnO | 0.003 | 0.002 | 0.002 |
| $V_2O_5$ | 0.005 | 0.003 | 0.004 |
| $TiO_2$ | 0.023 | 0.015 | 0.022 |
| MnO | 0.142 | 0.141 | 0.135 |
| $Cr_2O_3$ | 5.460 | 5.398 | 5.493 |
| SUM | 100.000 | 100.000 | 100.000 |

TABLE 11

| Oxide | RM16 107 oxide % | 480 oxide % | 1000 oxide % |
|---|---|---|---|
| CaO | 91.610 | 91.860 | 92.388 |
| $SiO_2$ | 4.379 | 4.276 | 4.016 |
| $Al_2O_3$ | 1.619 | 1.666 | 1.527 |
| MgO | 0.910 | 0.803 | 1.117 |
| $Fe_2O_3$ | 0.785 | 0.785 | 0.571 |
| $Na_2O$ | 0.145 | 0.065 | 0.033 |
| $K_2O$ | 0.320 | 0.315 | 0.157 |
| $P_2O_5$ | 0.092 | 0.092 | 0.083 |
| ZnO | 0.008 | 0.008 | 0.006 |
| $V_2O_5$ | 0.007 | 0.005 | 0.004 |
| $TiO_2$ | 0.079 | 0.078 | 0.063 |
| MnO | 0.039 | 0.039 | 0.031 |
| $Cr_2O_3$ | 0.007 | 0.008 | 0.004 |
| SUM | 100.000 | 100.000 | 100.000 |

Example 1

Waste materials RM3, RM7, RM8, RM9 and RM16 were, individually ground to a particle size of about 5 mm in diameter. The resultant ground waste materials were individually thermally treated to a temperature of 107° C. using a standard rotary kiln. The treated waste material was subsequently ground to a particle size of less than about 50 μm in diameter (which is substantially the same particle size as cement). The resultant treated waste materials are used to create a blend which can be used as a partial replacement of Portland cement in the percentages given in table 12. The resultant blend is blended with Portland cement such that the Portland cement is replaced at levels between 20%-80% dependant on applications, but generally between 25% and 50%.

As indicated in table 12, the chemical composition of the resultant blended cement falls within the limits set out in EN196-02, however, the cement 'fails' on loss of ignition and insoluble residue tests.

Example 2

The waste materials RM3, RM8 and RM9 were prepared as in Example 1. However, RM7 and RM16 were ground to a particle size of about 50 μm after being thermally treated to 107° C., before being thermally treated in a fluidised bed at a temperature of 480° C. and subsequently thermally treated to a temperature of about 100° C. in a rotary kiln prior to grinding to a particle size of about 40 μm in diameter.

The resultant ground and thermally treated waste materials are used to create a blend to partially replace cement in the percentages given in Table 13. As can be seen from Table 13, the chemical composition of the resultant blended cement falls within the limits set out in EN:196-2 and also has the desired Loss on Ignition and Insoluble Residue tests.

Therefore the examples show that by carefully selecting the temperature to which the waste materials are thermally treated, and choosing the percentages of each treated waste material to be added to the blend, a partial replacement of Portland cement can be produced.

Example 3

The MgO RM23 is added directly from the CJC process to the portland cement and can also be added to GGBS & PFA with the same effect of increased strength performance however the strength gain is seen in day one with the later two.

Six samples of RM23 were prepared as above, however each sample contained 5% MgO of varying purity, as given below:

| Sample | MgO product | Chemical Analysis |
|---|---|---|
| RM23A | CJC Mag Oxide 93/12f | CaO 0.99; $SiO_2$ 1.04; $Fe_2O_3$ 1.39; $Al_2O_3$ 0.39; MgO 93.6 |
| RM23B | CJC Mag Oxide 93/34f | CaO 0.99; $SiO_2$ 1.00; $Fe_2O_3$ 0.20; $Al_2O_3$ 0.39; MgO 92.2 |
| RM23C | CJC Mag Oxide 96/575 | CaO 1.50; $S.O_2$ 1.00; $Fe_2O_3$ 0.20; $Al_2O_3$ 0.25; MgO 93.8 |
| RM23D | CJC Mag Oxide Q | CaO 1.50; $SiO_2$ 1.00; $Fe_2O_3$ 0.2; $Al_2O_3$ 0.25; MgO 90.0 |
| RM23E | CJC Mag Oxide N | CaO 1.5; $SiO_2$ 1.00; $Fe_2O_3$ 0.2; $Al_2O_3$ 0.25; MgO 88.5 |
| RM23F | CJC Mag Oxide p | CaO 0.99; $SiO_2$ 1.00; $Fe_2O_3$ 0.20; $Al_2O_3$ 0.25; MgO 91.0 |

Each sample was then tested for strength over 84 days. The results are given in FIG. 1. It can be seen from FIG. 1 that RM23A, RM23B and RM23C all produced stronger cementitious materials.

Example 4

The preferred particle size of the waste materials used in the blend according to the present invention was tested using samples of RM7 and RM11 (prepared as above). The particle size was varied between Pan and Beta Mill. The results from RM7 are given in FIG. 2, and the results from RM11 are given in FIG. 3.

Figure 2:
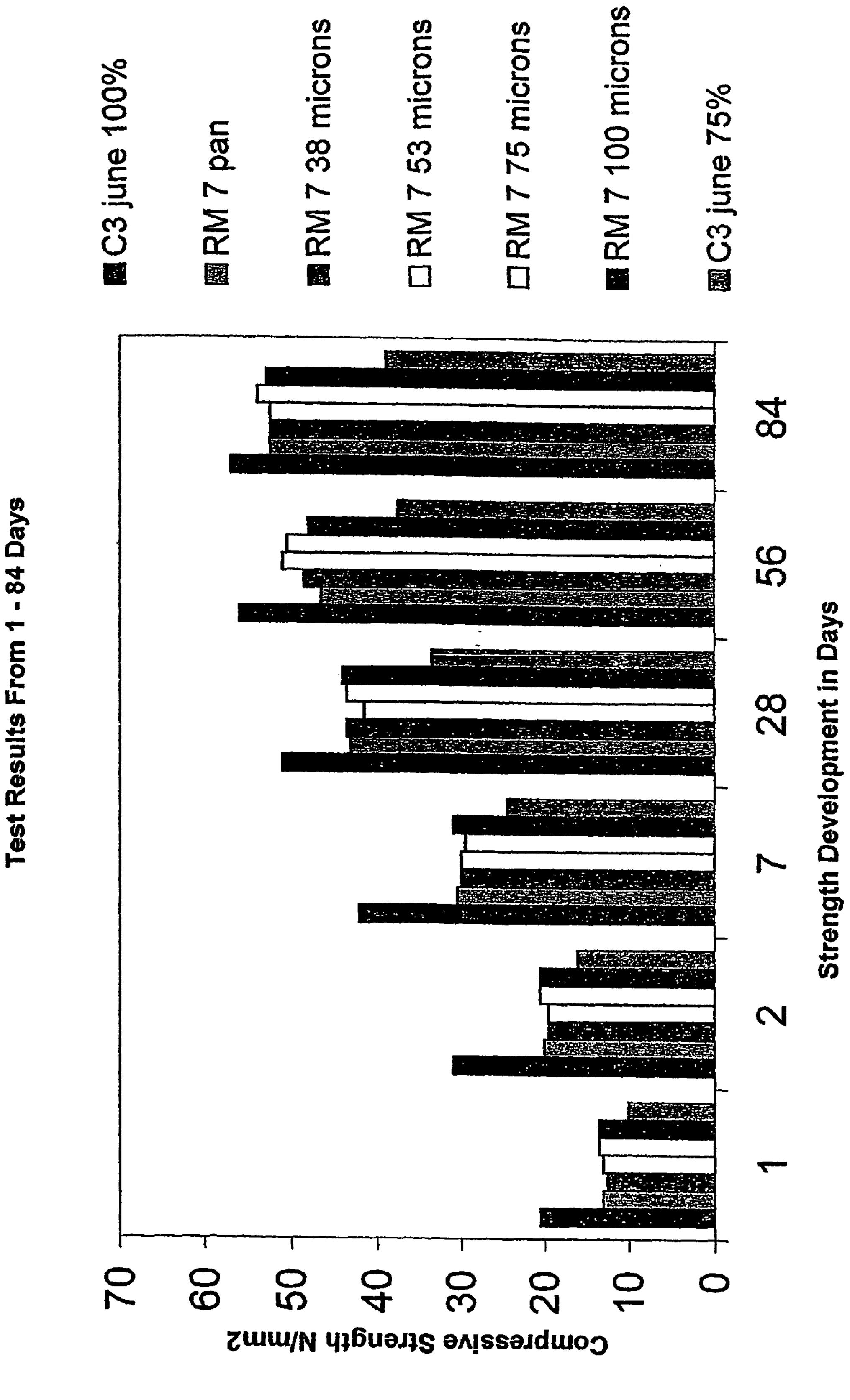
Figure 3:
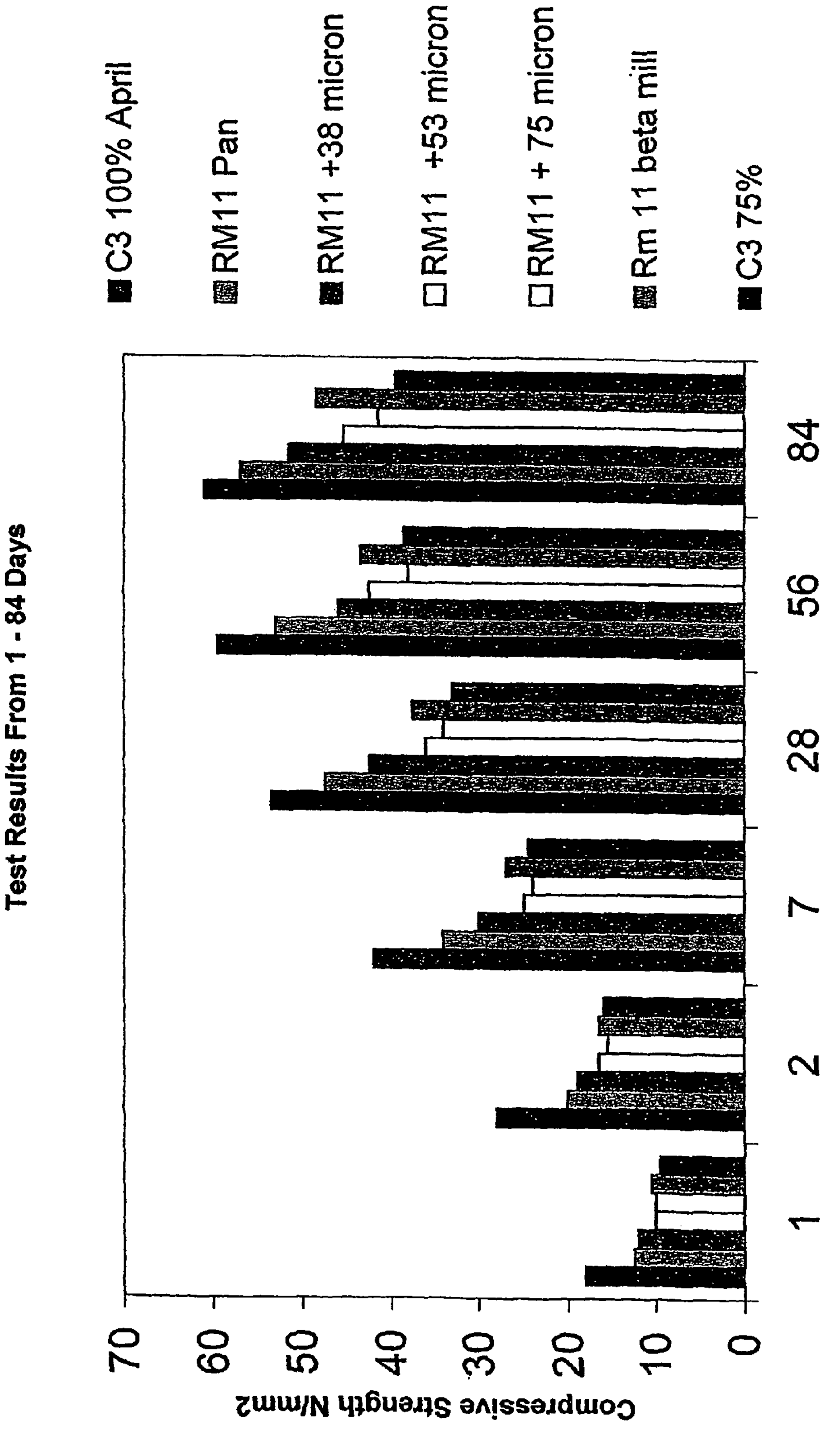

It can be seen from FIG. 2 that a coarser particle size of the waste material RM7 prior to blending improves the strength performance over time. However, from FIG. 3 it is evident that the finer particle size of the waste material RM11 prior to blending improves the strength performance.

Therefore, the particle size of the thermally treated waste material prior to blending is specific to each waste material and should be determined separately for each waste material.

Example 5

Figure 4A:
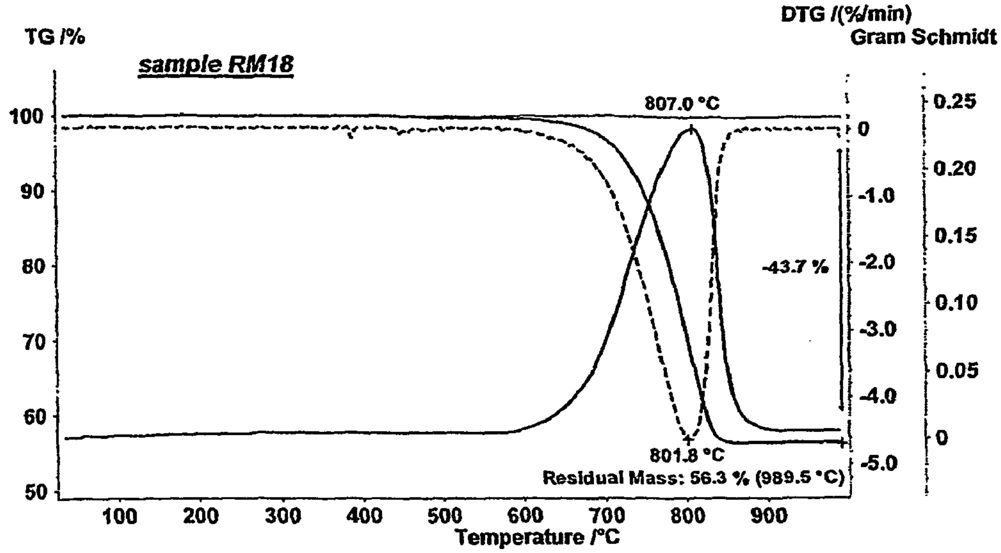
Figure 4B:
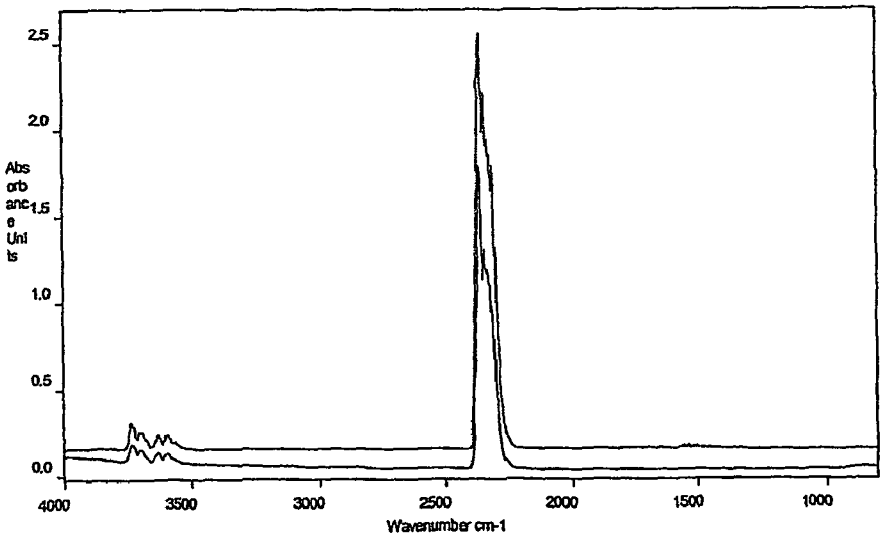

Waste material RM18 was thermally treated up to a temperature of 900° C. to determine the emission of greenhouse gasses. FIG. 4*a* represents the TG/DTG and Gran-Schmidt results for sample RM18, and FIG. 4*b* represents an IR spectrum at 809° C. and a comparison with library data for $CO_2$. It can be seen from FIGS. 4*a* and 4*b* that $CO_2$ is given off at temperatures above 800° C. which is particularly disadvantageous for the environment.

TABLE 12

| Blend 2 | Lower Limit | Upper Limit | Temp | 107 | 107 | 107 | 107 | 107 | 50% | 10% | 10% | 10% | 20% | | | | |
|---|---|---|---|---|---|---|---|---|---|---|---|---|---|---|---|---|---|
| | | | | RM3 | RM7 | RM8 | RM9 | RM16 | RM3 | RM7 | RM8 | RM9 | RM16 | RM | Element | Lower Limit | Upper Limit |
| % | | | Element | | | | | | | | | | | | | | |
| 26.516 | 28.851 | 46.736 | Ca | 21.660 | 18.765 | 11.073 | 31.384 | 47.820 | 10.830 | 1.877 | 1.107 | 3.138 | 9.564 | 0.000 | Ca | 28.851 | 48.736 |
| 6.659 | 5.804 | 16.227 | Si | 7.861 | 14.787 | 8.978 | 0.534 | 1.495 | 3.930 | 1.479 | 0.898 | 0.053 | 0.299 | 0.000 | Si | 5.804 | 16.227 |
| 2.759 | 1.498 | 6.771 | Al | 2.567 | 9.231 | 4.048 | 0.222 | 0.626 | 1.283 | 0.923 | 0.405 | 0.022 | 0.125 | 0.000 | Al | 1.498 | 6.771 |
| 1.435 | 0.584 | 5.106 | Mg | 1.950 | 0.578 | 3.103 | 0.110 | 0.401 | 0.975 | 0.058 | 0.310 | 0.011 | 0.080 | 0.000 | Mg | 0.584 | 5.106 |
| 3.851 | 0.256 | 2.205 | Fe | 0.777 | 0.332 | 3.380 | 30.126 | 0.401 | 0.389 | 0.033 | 0.336 | 3.013 | 0.080 | 0.000 | Fe | 0.256 | 2.205 |
| 0.125 | 0.030 | 0.492 | Na | 0.048 | 0.722 | 0.099 | 0.036 | 0.078 | 0.024 | 0.072 | 0.010 | 0.004 | 0.016 | 0.000 | Na | 0.030 | 0.492 |
| 0.271 | 0.460 | 0.967 | K | 0.241 | 0.947 | 0.152 | 0.014 | 0.195 | 0.121 | 0.095 | 0.015 | 0.001 | 0.039 | 0.000 | K | 0.460 | 0.967 |
| 1.401 | 0.006 | 0.057 | P | 0.012 | 13.614 | 0.234 | 0.040 | 0.029 | 0.006 | 1.361 | 0.023 | 0.004 | 0.006 | 0.000 | P | 0.006 | 0.057 |
| 0.004 | 0.016 | 0.315 | Zn | 0.002 | 0.010 | 0.008 | 0.002 | 0.005 | 0.001 | 0.001 | 0.001 | 0.000 | 0.001 | 0.000 | Zn | 0.016 | 0.315 |
| 0.014 | 0.004 | 0.017 | V | 0.022 | 0.003 | 0.023 | 0.003 | 0.003 | 0.011 | 0.000 | 0.002 | 0.000 | 0.001 | 0.000 | V | 0.004 | 0.017 |
| 0.254 | 0.096 | 0.375 | Ti | 0.427 | 0.041 | 0.282 | 0.013 | 0.035 | 0.214 | 0.094 | 0.028 | 0.001 | 0.007 | 0.000 | Ti | 0.096 | 0.375 |
| 0.479 | 0.028 | 0.068 | Mn | 0.425 | 0.008 | 2.511 | 0.103 | 0.022 | 0.212 | 0.001 | 0.251 | 0.010 | 0.004 | 0.000 | Mn | 0.026 | 0.068 |
| 0.365 | 0.002 | 0.009 | Cr | 0.004 | 0.003 | 0.098 | 3.524 | 0.004 | 0.002 | 0.000 | 0.010 | 0.352 | 0.001 | 0.000 | Cr | 0.002 | 0.009 |
| 0.383 | | 0.650 | Na2O eq | 0.255 | 1.722 | 0.254 | 0.060 | 0.259 | 0.127 | 0.172 | 0.025 | 0.006 | 0.052 | 0.000 | Na2O eq | | 0.650 |
| 0.010 | | 0.1 | Cl— | 0.008 | 0.015 | 0.006 | 0.008 | 0.022 | 0.003 | 0.002 | 0.001 | 0.001 | 0.004 | 0.000 | Cl— | | 0.1 |
| 0.000 | 3.5 | 5 | SO4 | | | | | | 0.000 | 0.000 | 0.000 | 0.000 | 0.000 | 0.000 | $SO_4$ | 3.5 | 5 |
| 9.98 | | 5.0 | Loss on Ignition | 2.06 | 5.15 | -0.10 | 11.29 | 36.60 | 1.03 | 0.52 | -0.01 | 1.13 | 7.32 | 0.00 | Loss on Ignition | | 5.0 |
| 0.35 | 1* | 2.5* | Free Lime | 0.30 | 0.07 | 0.03 | 0.10 | 0.90 | 0.15 | 0.01 | 0.00 | 0.01 | 0.18 | 0.00 | Free Lime | 1* | 2.5* |
| 9.30 | | 5.0 | In-soluble Resi-due | 1.06 | 65.96 | 16.11 | 0.80 | 2.43 | 0.53 | 6.60 | 1.61 | 0.08 | 0.49 | 0.00 | In-soluble Resi-due | | 5.0 |

TABLE 13

| Blend No.2a | Lower Limit | Upper Limit | Temp | 107 | 1000 | 107 | 107 | 1000 | 50% | 10% | 10% | 10% | 20% | | | | |
|---|---|---|---|---|---|---|---|---|---|---|---|---|---|---|---|---|---|
| | | | | RM3 | RM7 | RM8 | RM9 | RM16 | RM3 | RM7 | RM8 | RM9 | RM16 | RM | Element | Lower Limit | Upper Limit |
| % | | | Element | | | | | | | | | | | | | | |
| 26.516 | 28.851 | 46.736 | Ca | 21.660 | 18.765 | 11.073 | 31.384 | 47.820 | 10.830 | 1.877 | 1.107 | 3.138 | 9.564 | 0.000 | Ca | 28.851 | 48.736 |
| 6.659 | 5.804 | 16.227 | Si | 7.861 | 14.787 | 8.978 | 0.534 | 1.495 | 3.930 | 1.479 | 0.898 | 0.053 | 0.299 | 0.000 | Si | 5.804 | 16.227 |
| 2.759 | 1.498 | 6.771 | Al | 2.567 | 9.231 | 4.048 | 0.222 | 0.626 | 1.283 | 0.923 | 0.405 | 0.022 | 0.125 | 0.000 | Al | 1.498 | 6.771 |
| 1.435 | 0.584 | 5.106 | Mg | 1.950 | 0.578 | 3.103 | 0.110 | 0.401 | 0.975 | 0.058 | 0.310 | 0.011 | 0.080 | 0.000 | Mg | 0.584 | 5.106 |
| 3.851 | 0.256 | 2.205 | Fe | 0.777 | 0.332 | 3.380 | 30.126 | 0.401 | 0.389 | 0.033 | 0.336 | 3.013 | 0.080 | 0.000 | Fe | 0.256 | 2.205 |
| 0.125 | 0.030 | 0.492 | Na | 0.048 | 0.722 | 0.099 | 0.036 | 0.078 | 0.024 | 0.072 | 0.010 | 0.004 | 0.016 | 0.000 | Na | 0.030 | 0.492 |
| 0.271 | 0.460 | 0.967 | K | 0.241 | 0.947 | 0.152 | 0.014 | 0.195 | 0.121 | 0.095 | 0.015 | 0.001 | 0.039 | 0.000 | K | 0.460 | 0.967 |
| 1.401 | 0.006 | 0.057 | P | 0.012 | 13.614 | 0.234 | 0.040 | 0.029 | 0.006 | 1.361 | 0.023 | 0.004 | 0.006 | 0.000 | P | 0.006 | 0.057 |
| 0.004 | 0.016 | 0.315 | Zn | 0.002 | 0.010 | 0.008 | 0.002 | 0.005 | 0.001 | 0.001 | 0.001 | 0.000 | 0.001 | 0.000 | Zn | 0.016 | 0.315 |
| 0.014 | 0.004 | 0.017 | V | 0.022 | 0.003 | 0.023 | 0.003 | 0.003 | 0.011 | 0.000 | 0.002 | 0.000 | 0.001 | 0.000 | V | 0.004 | 0.017 |
| 0.254 | 0.096 | 0.375 | Ti | 0.427 | 0.041 | 0.282 | 0.013 | 0.035 | 0.214 | 0.004 | 0.028 | 0.001 | 0.007 | 0.000 | Ti | 0.096 | 0.375 |
| 0.479 | 0.026 | 0.068 | Mn | 0.425 | 0.008 | 2.511 | 0.103 | 0.022 | 0.212 | 0.001 | 0.251 | 0.010 | 0.004 | 0.000 | Mn | 0.026 | 0.068 |
| 0.365 | 0.002 | 0.009 | Cr | 0.004 | 0.003 | 0.098 | 3.524 | 0.004 | 0.002 | 0.000 | 0.010 | 0.352 | 0.001 | 0.000 | Cr | 0.002 | 0.009 |
| 0.383 | | 0.650 | $Na_2O$ eq | 0.255 | 1.722 | 0.254 | 0.060 | 0.259 | 0.127 | 0.172 | 0.025 | 0.006 | 0.052 | 0.000 | $Na_2O$ eq | | 0.650 |
| 0.010 | | 0.1 | Cl— | 0.008 | 0.015 | 0.006 | 0.008 | 0.022 | 0.003 | 0.002 | 0.001 | 0.001 | 0.004 | 0.000 | Cl— | | 0.1 |
| 0.000 | 3.5 | 5 | $SO_4$ | | | | | | 0.000 | 0.000 | 0.000 | 0.000 | 0.000 | 0.000 | $SO_4$ | 3.5 | 5 |
| 2.20 | | 5.0 | Loss on Ignition | 2.06 | 5.15 | -0.10 | 11.29 | 36.60 | 1.03 | 0.13 | -0.01 | 1.13 | -0.08 | 0.00 | Loss on Ignition | | 5.0 |
| 0.27 | 1* | 2.5* | Free Lime | 0.30 | 0.86 | 0.03 | 0.10 | 0.10 | 0.15 | 0.09 | 0.00 | 0.01 | 0.02 | 0.00 | Free Lime | 1* | 2.5* |
| 4.88 | | 5.0 | Insoluble Residue | 1.06 | 26.53 | 16.11 | 0.80 | 0.03 | 0.53 | 2.65 | 1.61 | 0.08 | 0.01 | 0.00 | Insoluble Residue | | 5.0 |

The invention claimed is:

1. A method of manufacturing a blend suitable for use in a cementitious material, which includes:

a) providing at least two waste materials, each containing one or more of calcium, silica, magnesium, aluminum, or iron;

b) thermally treating the at least two waste materials, either separately or as a mixture, to a first temperature of 100° C. or more such that surface water vapor present is substantially removed; and c) blending the at least two waste materials to provide a resultant blend, including selecting the at least two waste materials and employing amounts of the at least two waste materials such that the resultant blend has a reactive oxide chemical/physical composition in the following range, by weight of the resultant blend:

| | |
|---|---|
| Calcium oxide | 7.0 to 76% |
| Alumina | 0.1 to 30% |
| Iron oxide | 0.4 to 19% |
| Silica oxide | 1 to 36% |
| Magnesia | 0.1 to 32%. |

2. A method according to claim 1, which further includes:

d) mixing the resultant blend from step c) with Portland cement.

3. A method according to claim 2, which further includes:

e) hydrating the resultant blend and Portland cement mixed in step d).

4. A method according to claim 1, wherein the at least two waste materials are thermally treated separately in step b).

5. A method according to claim 1, which includes thermally treating the at least two waste materials to a second temperature so as to substantially change the chemical and/or physical composition of the at least two waste materials, prior to step c).

6. A method according to claim 5, wherein the at least two waste materials are thermally treated to the second temperature separately.

7. A method according to claim 5, wherein the at least two waste materials are thermally treated to a third temperature prior to step c).

8. A method according to claim 1, wherein the at least two waste materials are selected from the group consisting of power station ash produced as a result of burning of oil shale, weathered blast furnace slag, marble and granite produced during cutting and polishing (and mixes thereof), waste material from the ceramics industry, filter cake material from stainless steel processing, steel slag, pelletized blast furnace slag, granular blast furnace slag, aluminum flu dusts, waste material from the production of silica, hydrated lime, filter dust obtained from dust extraction from quarrying processes, waste material from slate recovery plants, dust/residue from reclamation of the scrap metal industry, waste material obtained from the glass production and disposal plants, incinerator ash from waste paper sludge, silica waste from chemical plants, magnesium waste from chemical plants and sewage sludge.

9. A method according to claim 1, wherein the at least two waste materials each include one or more of calcium, silica, aluminum, magnesium or iron, which are present in the oxide form.

10. A method according to claim 1, wherein the calcium oxide is present in the resultant blend in an amount from about 20.0% to about 70% by weight of the resultant blend.

11. A method according to claim 10, wherein the calcium oxide is present in the resultant blend in an amount from about 30% to about 60% by weight of the resultant blend.

12. A method according to claim 1, wherein the silica oxide is present in the resultant blend in an amount from about 5% to about 35% by weight of the resultant blend.

13. A method according to claim 12, wherein the silica oxide is present in the resultant blend is an amount 15% to 30% by weight of the resultant blend.

14. A method according to claim 1, wherein the magnesia is present in the resultant blend in an amount in the range from about 0.5% to about 15% by weight of the resultant blend.

15. A method according to claim 14, wherein the magnesia is present in the resultant blend in an amount to 10% by weight of the resultant blend.

16. A method according to claim 1, wherein the alumina is present in the resultant blend in an amount in the range from about 5% to about 20% by weight of the resultant blend.

17. A method according to claim 16, wherein the alumina is present in the resultant blend in an amount 10 to 16% by weight of the resultant blend.

18. A method according to claim 1, wherein the iron oxide is present in the resultant blend in an amount in the range from about 2.0 to 10% by weight of the resultant blend.

19. A method according to claim 18, wherein the iron oxide is present in the resultant blend in an amount from 3 to 8% by weight of the resultant blend.

20. A method according to claim 2, wherein the resultant blend is processed and/or stabilized prior to mixing with the Portland cement.

21. A method according to claim 20, wherein the processing and/or stabilization step includes thermally treating the resultant blend to a temperature above about 100° C.

22. A method according to claim 20, wherein the thermal treatment in step b) is in a rotary kiln at temperatures ranging from about 100° C. to over about 500° C., or in a fluidized bed drier at temperatures ranging from about 100° C. to about 500° C.

23. A method according to claim 22, wherein the at least two waste materials are treated to a temperature of no more than 500° C.

24. A method according to claim 1, wherein the at least two waste materials are thermally treated to a temperature of no more than about 200° C. so as to substantially reduce green house gas emissions.

25. A method according to claim 1, wherein the at least two waste materials each have a particle size of less than about 10 mm in diameter prior to step b).

26. A method according to claim 25, wherein the at least two waste materials each have a particle size of less than 5 mm in diameter prior to step b).

27. A method according to claim 1, wherein the at least two waste materials each have a particle size of less than about 100 μm in diameter prior to blending.

28. A method according to claim 27, wherein the at least two waste materials each have a particle size below 50 μm.

29. A method according to claim 1, wherein the at least two waste materials each have a particle size that is about the same size or less as the particle size of ordinary Portland cement.

30. A method according to claim 1, wherein the magnesia oxide is present as free reactive magnesia oxide.

31. A method according claim 30, wherein the magnesia oxide has a purity of about 42% to 100%.

32. A method according to claim 31, wherein the purity is 80% to 98%.

* * * * *